Aug. 5, 1969  C. L. WEIMER ET AL  3,459,872
BUS DUCT WITH IMPROVED CONNECTING MEANS
Filed June 24, 1966  4 Sheets-Sheet 4

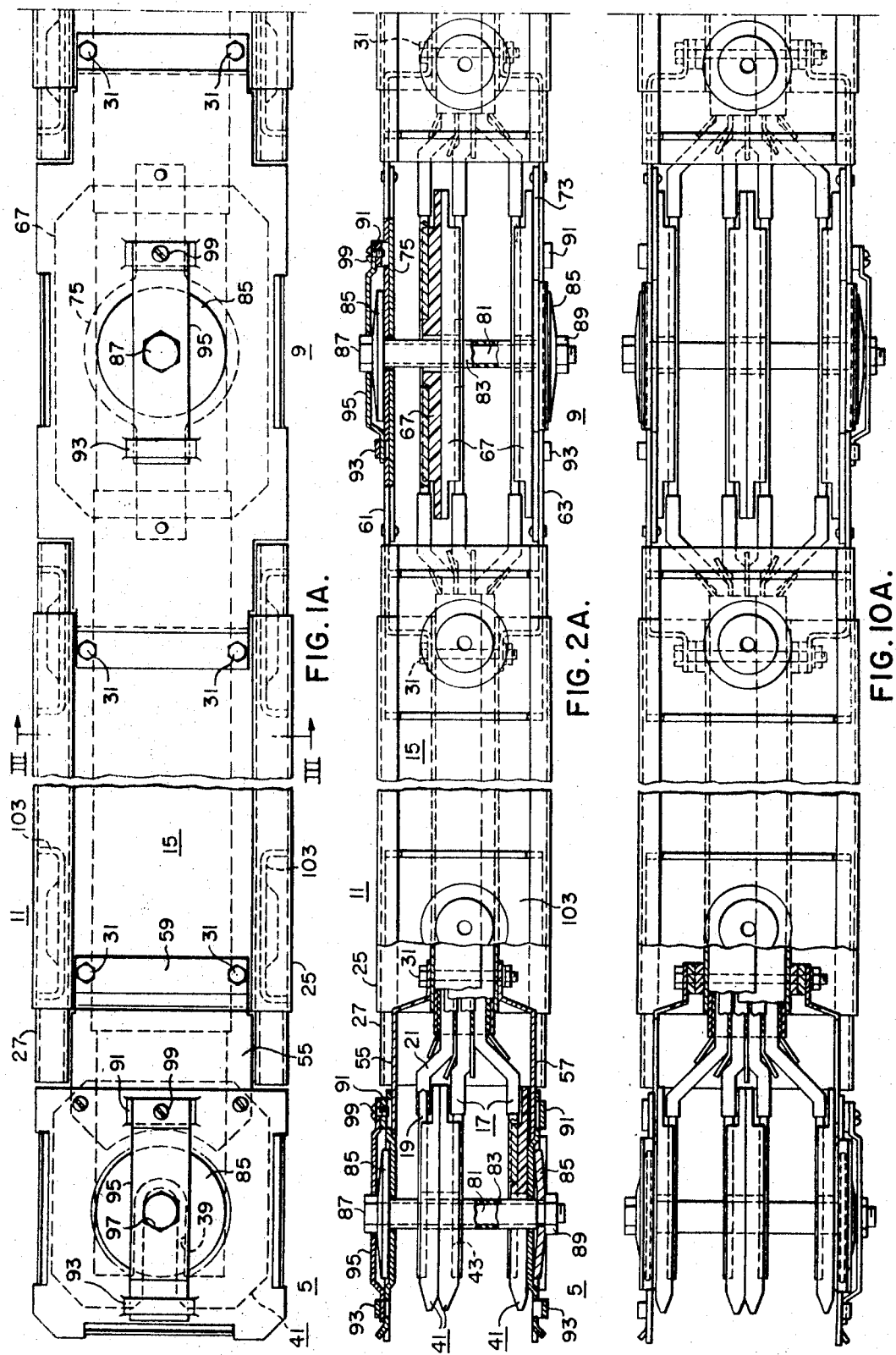

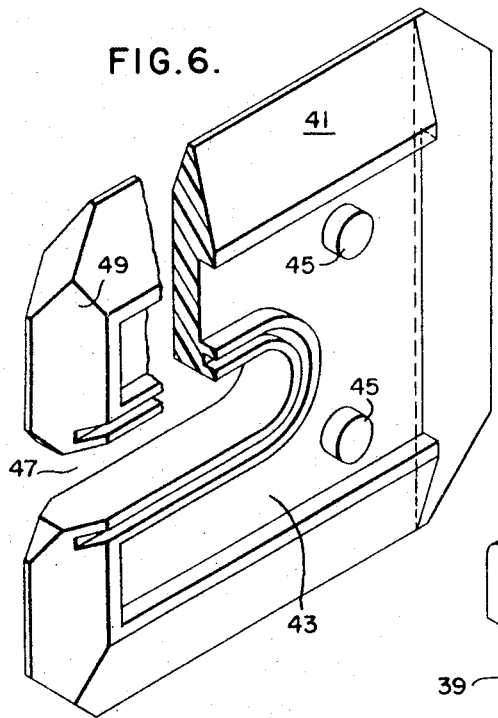
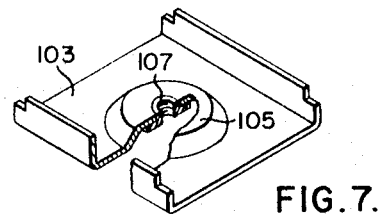
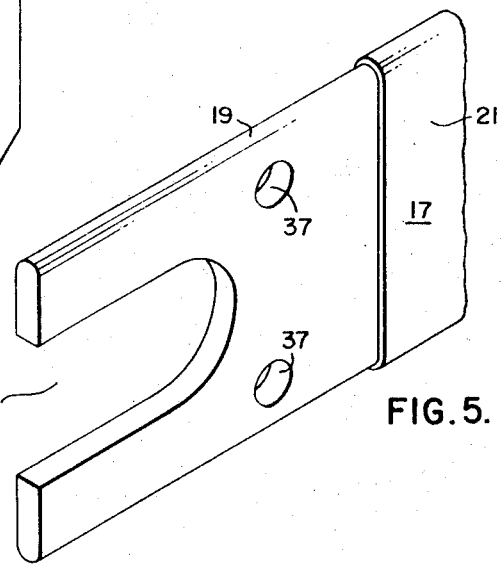
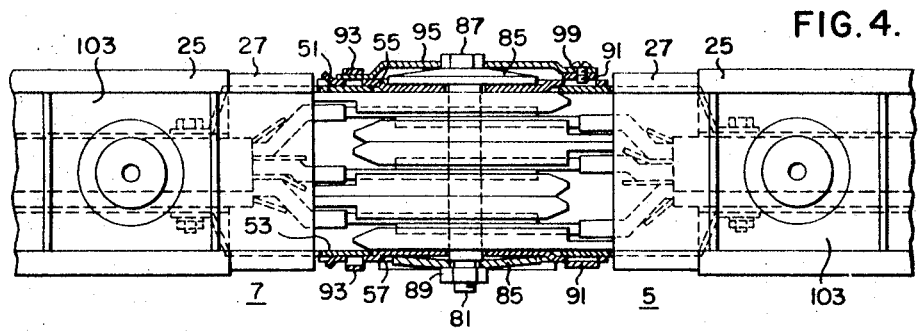
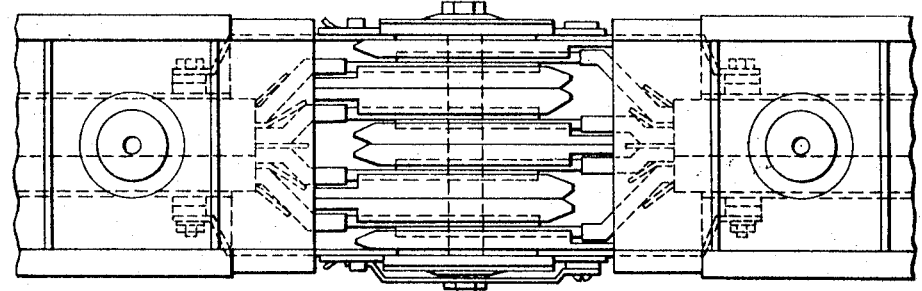

United States Patent Office 3,459,872
Patented Aug. 5, 1969

3,459,872
BUS DUCT WITH IMPROVED
CONNECTING MEANS
Charles L. Weimer, Beaver Falls, and Bill M. Shannon, Rochester, Pa., assignors to Westinghouse Electric Corporation, Pittsburgh, Pa., a corporation of Pennsylvania
Filed June 24, 1966, Ser. No. 560,277
Int. Cl. H02g 3/00, 5/00, 15/08
U.S. Cl. 174—71                 10 Claims

ABSTRACT OF THE DISCLOSURE

The invention provides bus duct comprising a unitary bus duct section having improved means for connecting a branch take-off intermediate the ends of the section.

---

Bus duct is generally manufactured in unit sections, which sections are connected together at the installation to provide a run or duct. For flexibility of installation, and in order to avoid the expenses and problems incurred in manufacturing and stocking certain T-type or elbow-type sections, it is desirable to provide a subject bus duct section that can be connected to a similar section in an end-to-end straight length or angle relationship and that can also be connected, at an intermediate connecting part intermediate the ends thereof, to an end of a similar section that extends normal to the direction of extension of the subject section.

Accordingly, an object of this invention is to provide an improved subject elongated section of bus duct that can be connected to a similar section in an end-to-end relationship and that can also be connected, at an intermediate connecting part intermediate the ends thereof, to an end of a similar elongated section.

Another object of this invention is to provide an improved subject elongated section of bus duct comprising main body parts constructed to dissipate heat through the housing of the section and a connecting part intermediate the main body parts constructed to be connected to an end of a similar section of bus duct.

A further object of this invention is to provide an improved subject elongated section to bus duct constructed to be connected to a similar section in an end-to-end relationship by means of a single bolt structure that can be worked from outside of the housing of the bus duct, which section comprises an intermediate connecting part that can be connected to an end of a similar section by means of a single bolt structure that can be worked from outside of the housing.

Another object of this invention is to provide an improved section of bus duct that can be connected to a similar section of bus duct by means of a single bolt structure that can be worked from outside of the housing, which section comprises improved lock means that can be removably mounted at either of two sides of the section to cooperate with either end of the single bolt structure whereby a worker who has access to only one side of the section can operate the single bolt structure from the one side.

A general object of this invention is to provide an improved bus duct structure that is economical to manufacture and efficient in operation.

These and other objects of this invention will become more apparent upon consideration of the following detailed description when taken in conjunction with the accompanying drawings.

In said drawings:

FIGURES 1A and 1B are a top plan view, with parts broken away, of one section of bus duct constructed in accordance with principles of this invention. The figure is illustrated on two separate sheets because of space limitations on the drawing papers;

FIGS. 2A and 2B are a side view, with parts broken away and with parts shown in section, of the bus duct section of FIG. 1;

FIG. 4 is a side view, with parts broken away, illustrating an end-to-end type, of connection between two of the sections illustrated in the above-mentioned figures;

FIG. 5 is a perspective view of an end of one of the bus bars of the previous figures;

FIG. 6 is a perspective view, with parts broken away, of one of the insulators of the previous figures, which insulator is illustrated in an exploded position relative to the bus bar of FIG. 5;

FIG. 7 is a perspective view, with parts broken away, of one of the cover plate mounting members seen in the previous figures;

FIGS. 10A and 10B are a side view, with parts broken away, of a section of bus ducst similar to that illustrated in the previous figures except that the section of bus duct in FIGS. 10A and 10B comprises four bus bars; and FIG. 11 is a view similar to FIG. 4 illustrating an end-to-end type of connection of two of the sections illustrated in FIGS. 10A and 10B.

Figure 3:
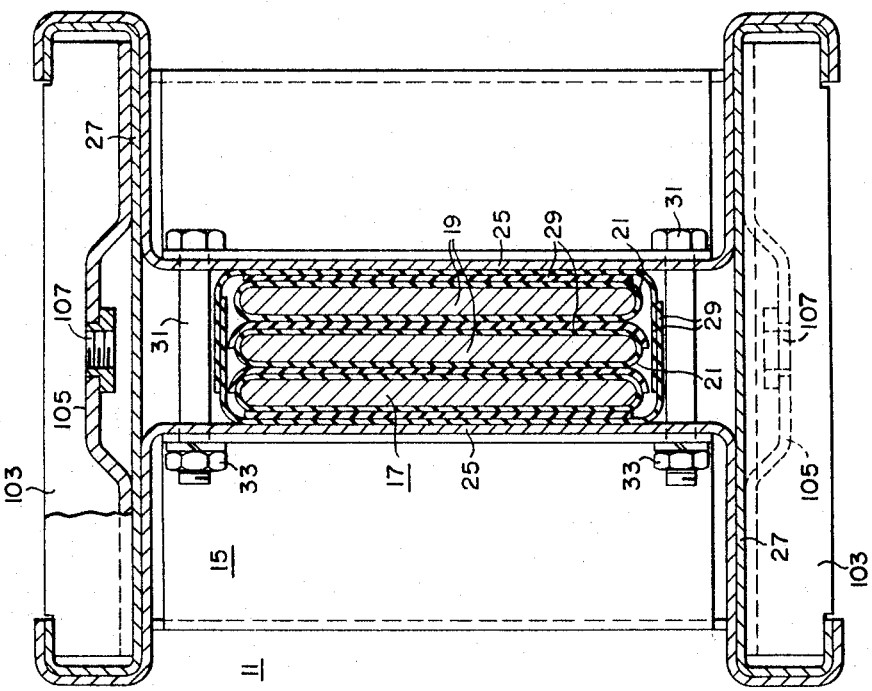
FIG. 3 is a sectional view, with parts broken away, taken generally along the line III—III of FIG. 1A.

Referring to the drawings, there is shown in FIGS. 1A, 1B, 2A and 2B an elongated section 3 of bus duct comprising a first connecting-end part 5 at one end thereof, a second connecting-end part 7 at the other end thereof and an intermediate connecting part 9 intermediate the ends 5 and 7. The unitary section 3 of bus duct is shown in two parts on the two sheets of paper because of space limitations on one sheet of paper. The section 3 comprises a main body part 11 between the intermediate connecting part 9 and the connecting-end part 5 and a main body part 13, that is identical to the part 11, between the intermediate connecting part 9 and the connecting-end part 7. Only the main-body part 11 will be specifically described with reference to FIG. 3, it being understood that the description applies to both of the main body parts 11 and 13.

Figure 2B:
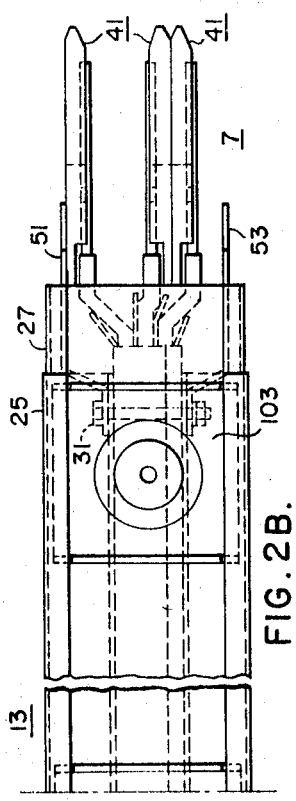

The section 3 comprises a housing structure 15 and a set of three bus bars 17 supported in the housing structure 11. The bus bars 17 are sandwiched together in a compact relationship at the main body parts 11, 13 and they are offset at the connecting parts 5, 7 and 9 to enable connection of the section to a similar section. Each of the bus bars 17 comprises a conducting bar 19 and an insulating sleeve 21 supported on the conducting bar 19. As can be seen in FIGS. 2A and 2B, the bars 19 are un-insulated at the connecting parts 5, 7 and 9 to permit connection of the uninsulated parts of the bars to uninsulated parts of a similar section in an overlapping relationship.

The construction of the main body parts 11 and 13 is more specifically described in the copending patent application of Charles L. Weimer and Bill M. Shannon, Ser. No. 560,129, filed June 24, 1966, and assigned to the assignee of the instant application. Thus, only a brief description of the main body parts 11, 13 is given herein. Only the main body part 11 will be described with reference to FIG. 3, it being understood that the description applies to both of the main body parts 11 and 13. As can be seen in FIG. 3, the three bus bars 17 are generally flat members supported in a stacked mutually flatwise face-to-face relationship. The housing structure 15 comprises a first pair of housing members 25 and a second pair of housing members 27. The housing members 25 are generally U-shaped aluminum members with channel portions formed at the free ends of the legs thereof. The housing members 27 are generally C-shaped members with the free ends of the legs thereof bent over. The housing members 27 are disposed in a nested relationship between the housing members 25. A plurality of stiff insulating members 29 are supported between the adjacent bus bars 17 and between the outermost bus bars 17 and the housing members 25. A plurality of pairs of bolt members 31 are passed through suitable openings in the housing members 25. Nut members 33 are screwed onto the threaded ends of the bolts 31 and tightened drawing the housing members 25 toward each other to tightly sandwich the bus bars 17 and insulating members 29 between the bight portions of the housing members 25 and to provide a frictional engagement between the housing members 25 and the housing members 27 to thereby support the parts in the manner shown in FIG. 3. Screws (not shown) are screwed in through openings in the housing members 25 into suitable openings in the housing members 27 at spaced intervals along the length of the section. With the bight portions of the housing members 25 drawn together toward the bus bars 17, heat may be conducted through the insulators and bus bars to the housing members 25. The housing members 25 are good heat conducting members of aluminum and they are provided with relatively large surface areas to better dissipate the heat from the bus bars into the surrounding air. The housing members 27 are rigid members of steel to provide structural strength for supporting the aluminum heat-dissipating housing members 25 and to provide support to enable the section of bus duct to be suspended in different orientations by means of different types of hanger structures in the manner specifically described in the aforementioned patent application of Charles L. Weimer et al., Ser. No. 560,129, filed June 24, 1966. A plurality of pairs of bolts 31 are provided along the length of the section of bus duct.

As can be seen in FIGS. 2A and 2B, the bus bars 17 are offset at the connecting-end parts 5, 7 and at the intermediate connecting part 9. Each of the conducting bars 19 of each bus bar 17 is a unitary one-piece conductor formed with two openings 37 (FIG. 5) and a slot 39 at each of the two opposite ends of the conducting bar 19. A separate insulating spacing member 41 (FIGS. 2A, 2B and 6) is supported on each conducting bar 19 at each of the two opposite ends of the conducting bar. Each of the insulating spacing members 41 is a molded member formed with a depression 43 (FIG. 6) for receiving the end of the associated conducting bar 19 in a nested relationship. Each insulating spacing member 41 is formed with two projections 45, that fit in the two openings 37 of the associated conducting bar 19, and a slot 47 that aligns wtih the slot 39 of the associated conducting bar 19. The depth of the depressions 43 is of less dimension than the thickness of the conducting bar 19 so that the connected overlapping bus bars 19 will engage when sections are connected together in a manner to be hereinafter described. Each of the insulating spacing members 41 is provided with beveled end portions 49 to engage beveled portions 49 of insulating members 41 of another section to guide the parts together when the sections are moved into the connected position seen in FIG. 4.

Figure 1B:
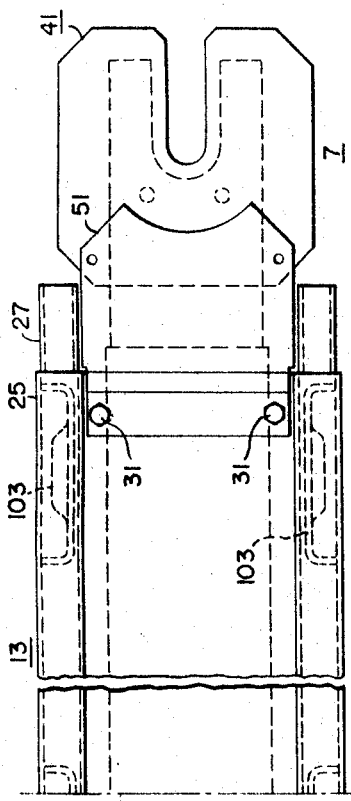
Figure 9:
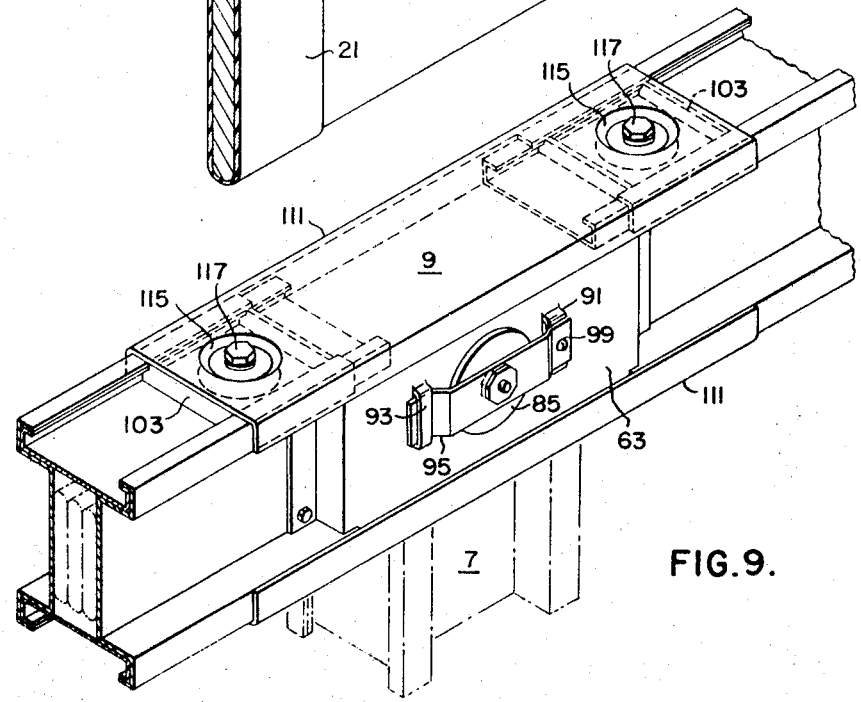
FIG. 9 is a perspective view, with parts broken away, illustrating a connection between an intermediate connecting part of one section of bus duct and an end of another section of bus duct both of which sections are constructed as disclosed in the previous figures.

As was previously described with reference to FIG. 3, the main body parts 11 and 13 of the housing structure 15 comprise the oppositely disposed members 25 and the oppositely disposed members 27. A front plate 51 (FIGS. 1B and 2B) and a back plate 53 are provided at the connecting-end part 7 to cooperate with a front plate 55 (FIGS. 1A and 2A) and a back plate 57 at the connecting end part 5 of a similar section of bus duct in order to close off the front and back of the housing at the connection (FIG. 4) of two similar sections. Each of the plate members 51, 53, 55 and 57 is bent-over to extend inwardly to a position where the plate is connected to the associated housing member 25 by means of the associated pair of bolt members 31. As can be seen in FIGS. 1A and 2A, a front plate 61 and back plate 63 are provided at the intermediate connecting part 9 each of which plate members is bent over at each of the opposite ends thereof and secured to the associated housing member 25 by means of the two pairs of bolt members 31 at the opposite ends of the plate members 61, 63 of a subject section cooperate with the plate members 51, 53 of a similar section that is to be connected to the subject section at the intermediate connecting part 9 (FIG. 9). It is to be noted in FIGS. 1A, 1B, 2A and 2B that the housing parts 25 terminate short of the housing parts 27 in proximity to the connecting parts 5, 7 and 9, and that the opposite sides of the housing are open at the connecting parts to permit the sections to be connected together in a manner to be hereinafter described. When the sections are connected together as either a straight length or at right-angles, additional means, to be hereinafter described, is provided to close off the openings at the connection.

Figure 8:
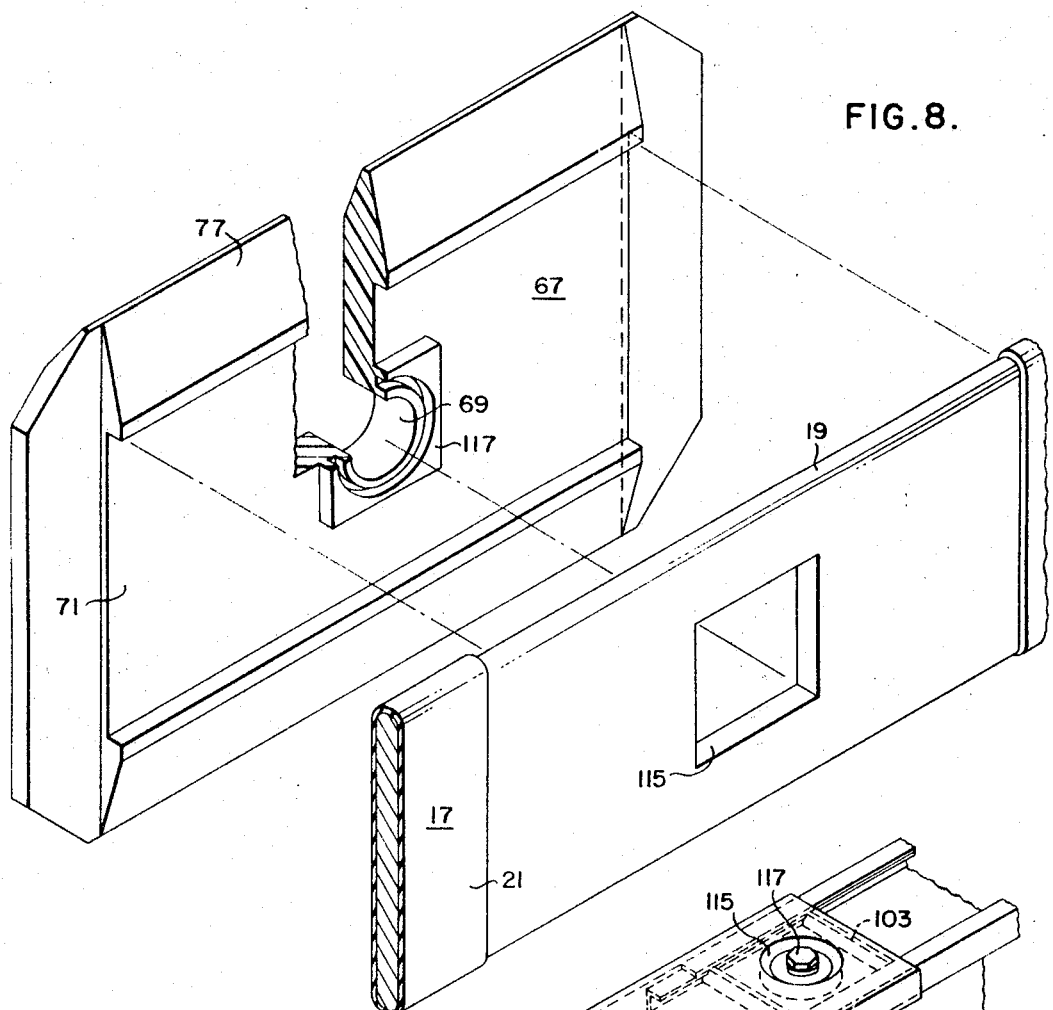
FIG. 8 is an exploded perspective view, with parts broken away, of one of the insulators and part of one of the bus bars of the intermediate connecting part of the section of bus duct of FIGS. 1A, 1B, 2A and 2B.

Referring to FIGS. 1A, 2A and 8, it will be noted that three rigid insulating spacing members 67 are supported at the intermediate connecting part 9. Each of the insulating spacing members 67 is a molded member having an opening 69 therein and a depression 71 therein. Two of the insulating members 67 are supported in a back-to-back relationship between the two upper bus bars seen in FIG. 2A and a third of the insulating members 67 is supported between the lower bus bar and a lower spacing member 73 that is supported between the plate 63 and the lower member 67. An upper spacing member 75 is also provided adjacent the upper plate member 61. Each of the depressions 71 is less in dimension than the thickness of the associated subject bar 19 to permit a pressure connection between the associated bar 19 and a bar of another section that is to be connected to the subject bar in a manner to be hereinafter described. Each of the insulating spacing members 67 is beveled at the opposite sides 77 thereof to cooperate with the beveled surfaces 49 of insulating members 41 of another section to thereby guide the parts together when the sections are moved into a connecting position.

As can be seen in FIG. 2A, a bolt member 81 and insulating tube 83 extend through the aligned bus bar and insulating member slots 39, 47 (FIGS. 5 and 6) and through suitable openings in the front plate 55 and back plate 57. The bolt 81 extends through openings in a pair of spring washer members 85 that are provided on the outer sides of the plates 55 and 57. The bolt 81 is provided with a bolt head 87 at one end thereof, and a threaded portion at the other end thereof cooperates with a nut 89 having the same outside shape and dimension as the bolt head 87. Each of the housing plate members 55 and 57 is formed with a stamped-out screw support part 91 and a stamped-out bracket part 93. A lock member 95, that is provided with a hexagonal opening 97 for receiving the hexagonal bolt head 87 to key with the bolt head 87, is mounted on the front plate 55. When the lock member 95 is moved into position, one end thereof is moved under the bracket support part 93, and a screw 99 is passed through a suitable opening in the other end of the lock member 95 and screwed into an opening in the support part 91 to mount the lock member 95 in place. When the lock member 95 is in the mounted position shown in FIGS. 1A and 2A, the bolt head 87 is locked in the opening 97 to prevent rotation of the bolt 81 when the nut 89 is rotated.

Referring to FIG. 4 it will be seen that when two sections of bus duct are to be connected in an end-to-end relationship, at least one of the sections is moved longitudinally relative to the other section to move the bus bars of the sections into an overlapping relationship. The aligned bus bar and insulating member slots 39, 47 (FIGS. 5 and 6) of the connecting-end part 7 of one section receive the bolt 81 and insulating tube 83 that are supported on the connecting-end part 5 of the other section. The parts of two sections are shown in FIG. 4 in the connected position with the connecting-end part 7 of one section connected to the connecting-end part 5 of the similar section. In the connected position, the front plate 55 of one section overlaps the front plate 51 of the similar section and the back plate 57 of one section overlaps the back plate 53 of the similar section to close off the front and back of the housing structure at the connection. As can be seen in FIG. 4, the sides are open. With the open sides, it can be understood that the connection could be made at either of two right-angle positions with one of the sections rotated 90° in either direction about the axis of the bolt 81. When the sections are in the position seen in FIG. 4, the nut 89 is tightened with the bolt 81 restricted from rotation by the lock member 95. As the nut 81 is tightened, pressure is applied to the opposite spring washers 85 which are drawn inwardly to draw the front plate 55 and back plate 57 toward each other. The plates 55 and 57 flex slightly to permit the tightening operation. As the plates 55 and 57 are drawn toward each other the rigid insulating members 41 and bus bars are sandwiched together in a tight compace relationship to physically and electrically connect each of the conducting bars 19 of one section with a conducting bar 19 of the other section. As was previously described, the depth of the slots 43 (FIG. 6) in the insulating spacing members 41 is less than the dimension of the conducting bars 19 so that each of the conducting bars 19 will engage the associated conducting bar in an overlapping relationship at the connection. The spring washers 85 provide a biasing force to provide contact pressure between the connected bus bars in the connected position. As can be seen in FIGS. 2A and 2B and 4, the bus bars are offset at the opposite ends in such a manner as to permit the ends of similar sections to mate properly when the connecting-end part 5 of one section is connected to the connecting-end part 7 of the other section. It will be noted that the two lower bus bars and insulators of the connecting-end part 7 fit between the two lower bus bars of the connecting-end part 5 and that the upper bus bar and insulating spacing member 41 of the connecting-end part 7 fits between the upper bus bar and the front plate 55 of the connecting-end part 5.

If it is discovered that a worker will not have free access to tighten the nut 89 because of an obstacle of construction at the installation, the screw 99 (FIGS. 1A and 2A) can be removed and the lock member 99 lifted out from under the bracket support part 93. The lock member 95 can then be placed under the bracket support part 93 (FIGS. 2A and 4) of the back plate 57 and the screw 99 can be screwed into the opening in the support part 91 of the back plate 57. In this position the hexagonal opening 97 in the lock member 95 receives the hexagonal nut 89 to prevent rotation of the nut 89. Thereafter, when the sections are moved into place the bolt head 87 can be rotated with the lock member 95 preventing rotation of the nut 89 so that the connection can be effected when the worker has access to the front or upper side, as seen in FIG. 2A, of the bus duct.

As can be seen in FIGS. 1A, 1B, 2A and 2B, a separate cover support member 103 is supported at each end of the bus duct section on each of the two opposite sides of the housing. Each of the members 103 (FIG. 7) is a rigid metallic member having a raised center part 105 with a tapped insert 107 therein. Each cover support member 103 is supported on the housing with the opposite sides thereof being positioned in the opposite channel parts of the housing in a manner disclosed in FIG. 3. Each of the members 103 is welded or otherwise fixedly secured in position. When the sections are connected (FIG. 4), a separate cover member 111 (FIG. 9) is provided to close off each of the two open sides of the sections at the connection. As can be seen in FIG. 9, the cover member 111 is moved into position with opposite openings in depressed parts 115 of the cover member being aligned with the tapped inserts 107 (FIG. 7) of the cover plate support member 103. Thereafter, a separate screw member 117 is threaded into the tapped insert 107 of each of the two cover support members 103 to fixedly secure the cover plate 111 in position. When the sections are connected as an angle connection the cover members are formed to match the angle of the connection.

Referring to FIG. 2A, it will be seen that a bolt structure, similar to the bolt structure at the connecting-end part 5, is mounted at the intermediate connecting part 9. Thus, the same reference characters are used at the intermediate connecting part 9 to identify those parts that are the same as the parts disclosed at the connecting-end part 5. Each of the bus bars 19, at the intermediate connecting part 9, is provided with a rectangular opening 115 (FIG. 8) therein for cooperating with a molded rectangular part 117 of the associated insulating member 67 to lock the insulating spacing member 67 against movement on the bus bar. When it is desired to connect one section of bus duct to the intermediate connecting part 9 of another section, the connecting-end part 7 of the one section is moved into connecting position with the intermediate connecting part 9 of the other section with the aligned bus bar and insulating member slots 39, 47 (FIGS. 5 and 6) receiving the bolt 81 and insulating tube 83 in the same manner as was hereinbefore described with regard to the end-type connection. The two lower bus bars and insulating members 41 of the connecting-end part 7 of the one section fit between the two lower bus bars of the intermediate connecting part 9 of the other section and the upper bus bar and insulating member 41 of the connecting-end part 7 of the one section fit between the upper bus bar and the member 75 at the intermediate connecting part 9 of the other section. The connection is tightened in the same manner hereinbefore described from either of the two opposite sides of the bus duct. As can be seen in FIG. 9, a cover member 111 (FIG. 9) is mounted at the open side of one section to close off one side of the housing structure. Two cover members (not shown), that are similar to the cover member 111 seen in FIG. 9 except that they are formed as right-angle members to match the right-angles of the T-type connection, are similarly connected to the housings of the two sections at the inside of the T-type connection to complete the housing structure.

Figure 10B:
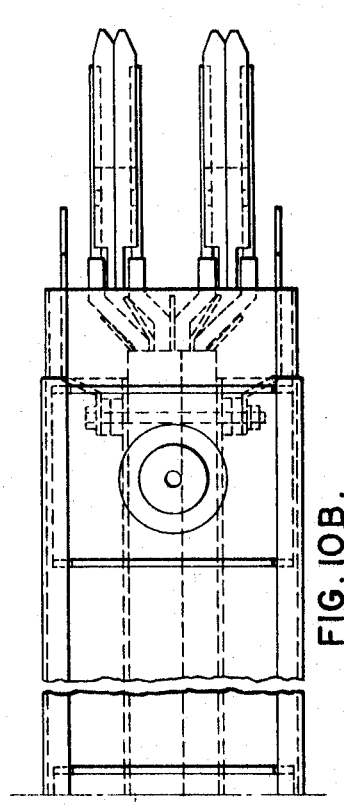

A similar section of bus duct is disclosed in FIGS. 10A and 10B, and an end-type connection of two of the 10A and 10B sections of bus duct is disclosed in FIG. 11. It will be noted that in this embodiment, the set of bus bars comprises four bus bars as opposed to the three bus bars of the previously described section. The only difference in the four bar construction is that the offsets are shaped differently (as can be seen in FIGS. 10A, 10B and 11) in order to provide that each bus bar will properly engage another bus bar in an overlapping relationship at the connection. Reference characters are not applied to FIGS. 10A, 10B and 11 since it is considered that the structures illustrated in these figures will be clearly understood when it is considered that these sections are the same as the previously described sections except for the difference in the number of bus bars and except for the different shape of offsets of the bus bars. The two lower bus bars and insulating members of the connecting-end part 7 will engage between the two lower bus bars of the connecting-end part 5 and the two upper bus bars and insulating members of the connecting-end part 7 will engage between the two upper bus bars of the connecting-end part 5 when the section disclosed in FIGS. 10A and 10B is connected to a similar section (FIG. 11). The one bolt structure connects the sections disclosed in FIG. 11 in the same manner hereinbefore described with reference to the three-bar sections. It is also to be understood that the four-bar section disclosed in FIGS. 10A and 10B can be connected, at the intermediate connecting part thereof, with a connecting end part of a similar section in the same manner hereinbefore described with reference to the three-bar construction. As can be seen in FIGS. 10A and 10B, the bus bars are offset such that the connecting end part 7 will cooperate with the intermediate connecting part.

From the foregoing, it can be understood that there is provided by this invention an improved bus duct construction. A subject elongated section of bus duct is provided that can be connected to a similar section in a straight length or angle-type end-to-end relationship and that can also be connected, at an intermediate connecting part intermediate the ends thereof, to an end of a similar section that extends generally normal to the direction of the subject section. The bus bars, along the main body parts of the section, are supported in a compact relationship between opposite housing members to provide for heat dissipation through the opposite housing members. The bus bars are offset at the opposite ends thereof and at the intermediate connecting part. A plurality of rigid insulating spacing members are supported at both ends and at the intermediate connecting part. The bus bars and insulating spacing members are provided with aligned slots at the opposite connecting-end parts, and a separate insulating spacing member is supported at each of the two opposite end parts on each of the bus bars. The insulating spacing members at the two connecting-end parts are identical in structure so that only the one type of end spacing member need be manufactured and stocked for use at the two connecting end parts. A one-bolt type connecting structure is supported at a first connecting-end part and a similar one-bolt type connecting structure is supported at the intermediate connecting part. The second connecting-end part of one section can be connected to the first connecting-end part of a similar section or to the intermediate connecting part of a similar section by positioning the sections and tightening the one bolt type pressure connector. Two sections can be connected in an end-to-end relationship as either a straight length or at either of two right-angle positions rotated about the axis of the connecting bolt. One section can be connected to a similar section at the intermediate connecting part from either of two sides of the similar sec-section in a direction extending generally normal to the direction of the similar section. When the sections are moved into the connected position only one bolt or nut need be tightened in order to effect a pressure-type connection. A lock member can be removably mounted on either of two oppositely disposed plate members to key with either the bolt head or nut to prevent rotation of either the bolt or nut. Thus, a worker who has access to only one side of the bus duct can tighten or loosen the connection from the one side.

We claim as our invention:

1. A first elongated unitary section of bus duct, said first section comprising a housing, a first set of a plurality of generally flat unitary bus bars supported substantially within said housing in a stacked mutually flatwise face-to-face relationship, each of said unitary bus bars in said first set being a continuous one-piece bus bar, said first section comprising an intermediate connecting part intermediate the opposite ends thereof, a second section, said second section comprising a second housing, a second set of a plurality of generally flat unitary bus bars supported substantially within said second housing in a mutually flatwise face-to-face relationship, said second section comprising an end connecting part at one end thereof, connecting means connecting said end connecting part of said second section with said intermediate connecting part of said first section with said second section extending transverse to the direction of extension of said first section, each of the unitary bus bars in said second section being in a lapped relationship with a separate one of the unitary bus bars in said first section, insulating spacing means between each pair of adjacent lapped bus bars, said connecting means drawing said lapped bus bars and insulating spacing means into a compact sandwiched relationship at said connection, said unitary bus bars of said first section being spaced at said intermediate connecting part to receive said unitary bus bars of said second section in said lapped relationship and to receive said insulating spacing means between each pair of adjacent lapped bus bars, said unitary bus bars of said first section flaring inwardly at the opposite ends of said intermediate connecting part to provide a main body part at one of said intermediate connecting part and a main body part at the opposite end of said intermediate connecting part, at each of said main body parts securing means drawing the bus bars of said first section into a compact sandwiched relationship.

2. A first elongated unitary section of bus duct, said first section comprising a housing, a first set of a plurality of generally flat unitary bus bars supported substantially within said housing in a stacked mutually flatwise face-to-face relationship, each of said unitary bus bars in said first set being a continuous one-piece bus bar, said first section comprising an intermediate connecting part intermediate the opposite ends thereof, a second elongated unitary section of the bus duct, said second section comprising a second housing, a second set of a plurality of generally flat unitary bus bars supported substantially within said second housing in a stacked mutually flatwise face-to-face relationship, said second section comprising an end connecting part at one end thereof, connecting means connecting said end connecting part of said second section with said intermediate connecting part of said first section with said second section extending transverse to the direction of extension of said first section, each of the unitary bus bars in said second section being in a lapped relationship with a separate one of the unitary bus bars in said first section, insulating spacing means between each pair of adjacent lapped bus bars, said connecting means drawing said lapped bus bars and insulating spacing means into a compact sandwiched relationship at said connection, each of said unitary bus bars of said first section having opening means therein at said intermediate connecting part, said connecting means comprising bolt means extending through said opening means in said bus bars of said first section, each of said bus bars of said second section having a slot therein at the connecting end part thereof, said second section being positioned with said bolt means in said slots, and said bolt means being tightened to draw said bus bars and insulating spacing means together into said compact sandwiched relationship at said connection.

3. The combination according to claim 2, and said bolt means comprising a single-bolt structure for affecting a single-bolt connection between said first and second sections.

4. The combination according to claim 3, said unitary bus bar of said first section at said intermediate connecting part being spaced to receive said unitary bus bars of said second section in said lapped relationship and to receive said insulating spacing means between each pair of adjacent lapped bus bars, said unitary bus bars of said first section being formed to flare inwardly at the opposite ends of said intermediate connecting part to provide a first main body part at one end of said intermediate connecting part and a second main body part at the opposite end of said intermediate connecting part, and at each of said main body parts means drawing the bus bars of said first section into a compact sandwiched relationship.

5. An elongated unitary section of bus duct, said section comprising an elongated housing, an elongated set of a plurality of generally flat untiary bus bars supported substantially within said housing in a stacked mutually flatwise face-to-face relationship, each of said unitary bus bars in said set being a continuous one-piece unitary bus bar, said set of unitary bus bars comprising a first connecting end part at one end thereof, said unitary bus bars at said first connecting end part at one end thereof, said unitary bus bars at said first connecting end part being spaced to receive additional bus bars and insulating means in a lap-type connection, said unitary bus bars being formed to flare inwardly from said first connecting end part to form a first main body part, a first securing means drawing said bus bars together into a compact sandwiched relationship at said first main body part, said set of unitary bus bars comprising a second connecting end part at the opposite end thereof, said bus bars at said second connecting end part being spaced to receive additional bus bars and insulating means in a lap-type connection, said unitary bus bars being formed to flare inwardly from said second connecting end part to a second main body part, a second securing means drawing said bus bars together in a compact sandwiched relationship at said second main body part, said unitary bus bars being formed to provide an intermediate connecting part intermediate said first and second main body parts with said unitary bus bars being spaced at said intermediate connecting part to receive additional bus bars and insulating means in a lap-type connection.

6. A section of bus duct according to claim 5, said housing comprising a first pair of housing wall members and a second pair of housing wall members forming a tubular housing structure housing said bus bars, said first securing means and said second securing means comprising means drawing a first of said pairs of housing wall members toward each other to draw said bus bars into said compact sandwiched relationship between said first pair of housing wall members.

7. A section of bus duct according to claim 6, said bus bars at said intermediate connecting part having aligned openings therein, and bolt means supported on said section extending through said aligned openings at said intermediate connecting part.

8. A first section of bus duct according to claim 7, a second elongated section of bus duct, said second elongated section comprising a housing, a set of a plurality of generally flat unitary bus bars supported substantially within said housing in a stacked mutually flatwise face-to-face relationship, said second section comprising a third connecting end part at one end thereof, the bus bars of said third connecting end part having aligned slots therein, said second section extending generally transverse to the direction of extension of said first section with said third connecting end part protruding into said intermediate connecting part such that each bus bar of said second section is positioned in a lapped relationship with a separate bus bar of said first section and with said bolt means being positioned in said aligned slots of the bus bars of said second section, insulating spacing means between each pair of adjacent lapped bus bars, and said bolt means biasing said insulating spacing means and said lapped bus bars into a compact sandwiched relationship to connect said third connecting end part of said second section with said intermediate connecting part of said first section.

9. Bus duct according to claim 8, and said bolt means comprising a single-bolt structure extending through said openings in said bus bars of said first section and through said slots in said bus bars of said second section which bolt means is tightened to effect said pressure connection.

10. Bus duct according to claim 9, said insulating spacing means comprising a first insulating spacing means supported on said first section at said intermediate connecting part and a second insulating spacing means supported on said second section at said third connecting end part with said first and second insulating spacing means cooperating to provide insulation between adjacent pairs of lapped bus bars and to provide insulation and spacing at the connection.

References Cited
UNITED STATES PATENTS

| | | |
|---|---|---|
| 3,183,298 | 5/1965 | Weimer et al. |
| 3,339,009 | 8/1967 | Davis et al. _____ 174—88 XR |
| 2,966,542 | 12/1960 | Shields. |
| 3,189,680 | 6/1965 | Stanback. |

DARRELL L. CLAY, Primary Examiner

U.S. Cl. X.R.

151—54; 174—88